United States Patent [19]
Wood

[11] 4,361,732
[45] Nov. 30, 1982

[54] TRUNK INTERFACE CIRCUIT WITH CURRENT COMPENSATION

[75] Inventor: Samuel F. Wood, Los Altos Hills, Calif.

[73] Assignee: Northern Telecom Limited, Montreal, Canada

[21] Appl. No.: 232,546

[22] Filed: Feb. 9, 1981

[51] Int. Cl.³ .......................... G05F 5/00; H04M 7/14
[52] U.S. Cl. ................................. 179/18 AH; 323/356
[58] Field of Search ........... 179/18 AH, 18 FA, 18 F; 323/356, 357

[56] References Cited

U.S. PATENT DOCUMENTS

| | | | |
|---|---|---|---|
| 4,027,235 | 5/1977 | Macrander et al. | 179/18 FA X |
| 4,103,112 | 7/1978 | Korsky | 179/18 FA |
| 4,243,842 | 1/1981 | Gibb | 179/18 FA |
| 4,289,933 | 9/1981 | Henry | 179/18 FA |

FOREIGN PATENT DOCUMENTS 54-146905  11/1979  Japan .............................. 179/18 AH

*Primary Examiner*—Thomas W. Brown
*Attorney, Agent, or Firm*—Schwartz, Jeffery, Schwaab, Mack, Blumenthal & Koch

[57] ABSTRACT

A trunk interface circuit useful for remotely terminating a two-wire central office trunk at a remote telephone facility includes a current compensated miniature transformer. The transformer includes windings for coupling voice band signals between the trunk and the remote telephone facility and a compensating winding for reducing d.c. flux associated with supervisory d.c. current applied to the trunk at the central office. A circuit connected with first and second portions of a first transformer winding provides signal indication of magnitude and either of two possible directions of current flow in the first winding. A bidirectional current regulation circuit conducts a compensating current in either of two directions in the compensating winding. The compensating current is regulated in accordance with the signal indication from the circuit connected with the first winding to reduce the d.c. flux in the transformer. The signal indication is also used by a supervisory signal detector to couple supervisory information to the remote telephone facility.

6 Claims, 1 Drawing Figure

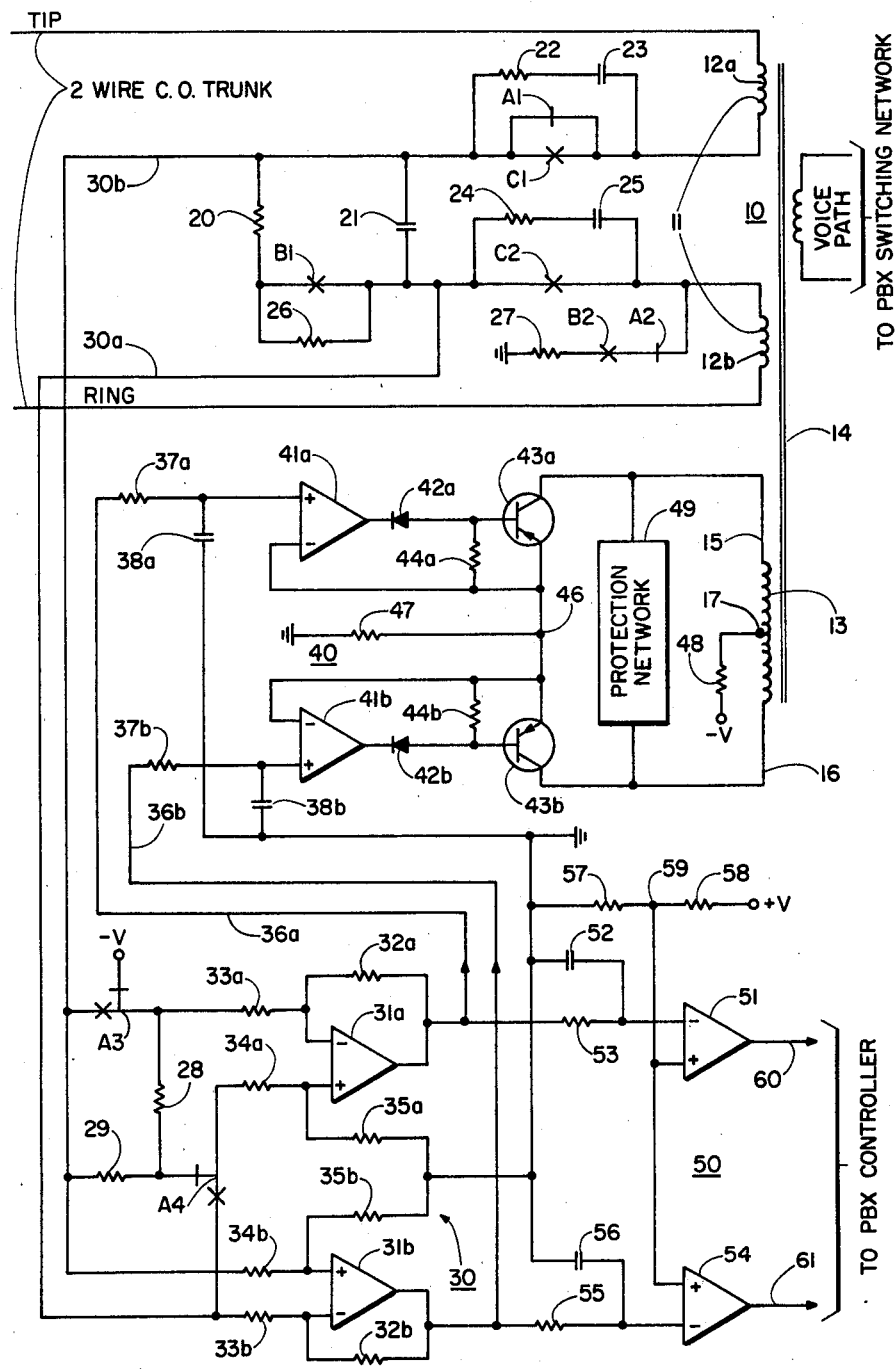

TRUNK INTERFACE CIRCUIT WITH CURRENT COMPENSATION

BACKGROUND OF THE INVENTION

1. Field of the Invention The invention relates to interface circuits for use in telephone systems and more particularly to a trunk interface circuit including a current compensated transformer.

2. Discussion of Related Art

In a telephone network, trunks are used to provide links between various telephone switching facilities. In the case of a two-wire trunk used for example between a private branch exchange (PBX) and a central office (CO), a PBX trunk interface circuit and a CO trunk interface circuit are used to provide termination for the trunk. Each of the trunk interface circuits are required to couple a.c. signals between the trunk and the respective associated telephone facility. In addition the trunk interface circuits are required to apply and respond to supevisory signalling which includes application of C.O. office battery across the two wire trunk in forward and in reverse directions. A transformer in the PBX trunk interface circuit includes a core of magnetic material which carries at least two windings. One of the windings is for connection in series between the leads of the trunk and the other is connected to a communication port of the PBX. As supervisory signalling direct current is conducted via the series connected winding, the transformer core is provided in sufficient bulk to prevent saturation of the core from d.c. flux associated with the supervisory signalling direct current.

Examples of miniaturized current compensated transformers in line circuits are disclosed by Max S. Macrander in U.S. Pat. No. 3,714,548 issued Jan. 1973; John F. O'Neill in U.S. Pat. No. 4,046,967 issued Sept. 1977; and Vincent V. Korsky in U.S. Pat. No. 4,103,112 issued July 1978. In each of these examples, subscriber loop energizing direct current is fed in one direction to a loop circuit through a transformer winding, while a complementary poled winding is caused to conduct a unidirectional balancing or compensating current. In contrast a trunk interface circuit is required to pass direct current in two directions, i.e. forward and reverse. In the case of a PBX trunk interface circuit a.c. signal coupling is required in the presence of remotely supplied supervisory signalling current flowing in either of two directions. Hence these trunk interface circuits have continued to be manufactured without the benefits of transformer miniaturization.

SUMMARY OF THE INVENTION

In accordance with the invention, a trunk interface circuit for interfacing a two-wire trunk with a telephone facility is provided. The trunk interface circuit includes a transformer having a core, a first winding structure including first and second portions for connection across the two-wire trunk and a compensating winding. A resistor is connectable in series current flow relationship between the first and second portions of the first winding for providing terminating resistance for the two-wire trunk. A bidirectional current regulation circuit is connected to the compensating winding and is responsive to a voltage being developed across the resistor for conducting a compensating current in either of two directions in the compensating winding to substantially reduce d.c flux associated with direct current flow in the first winding.

In one embodiment a first d.c. amplifier is responsive to a forward potential resulting from a foward current flow through the resistor for generating a signal indication. A second d.c. amplifier is responsive to a reverse potential resulting from a reverse current flow through the resistor for generating a signal indication. A first d.c. signal path is provided for coupling the signal indication from the first d.c. amplifier to a first input of the bidirectional current regulation circuit, and a second d.c. signal path is provided for coupling the signal indication from the second d.c. amplifier to a second input of the bidirectional current regulation circuit.

BRIEF DESCRIPTION OF THE DRAWING

The structure and operation of an example embodiment of the invention will become apparent with reference to the following description of a trunk interface circuit reference being made to the accompanying drawing which schematically illustrates the trunk interface circuit of the present invention.

Referring to the drawing, tip and ring leads of a two-wire trunk are a.c. coupled to a switching network in a telephone facility, not shown, by a transformer 10. Supervisory signalling is indicated by the presence or absence of direct current flow in either of forward or reverse direction in a first winding 11 in the transformer 10. In this example, the first winding 11 is split into first and second portions or halves 12a and 12b, which are substantially identical. The direct current is applied at a remote end of the two-wire trunk. A circuit indicated generally at 30 and including a resistor 20, provides a signal indication of direction and magnitude of current flow in the first winding 11. A voltage is generated across resistor 20 which is proportional to the current appearing in the first winding 11. A bidirectional current regulation circuit generally indicated at 40 is responsive to the signal indication on first and second d.c. signal paths 36a and 36b to regulate a direct current flow in either of two directions in a compensating winding 13 in the transformer 10, such that d.c. flux associated with the direct current flow in the first winding is substantially reduced. Accordingly a magnetically permiable core 14, in the transformer 10, is provided in bulk merely sufficient to couple voice band signal energy, typical of conversation signals, between the two-wire trunk and the switching facility.

The circuit generally illustrated at 30 provides complementary output signals on the first and second d.c. signal paths 36a and 36b. These output signals are also conveniently utilized in a supervisory signal detector generally indicated at 50 to provide two bit binary signal indications of supervisory status, of the two-wire trunks, for use by a controller, not shown, in the telephone facility. Switches generally identified with letters A, B and C are provided by relay contacts of three corresponding relays A, B and C, not shown. The relays A, B and C are controlled by the controller to configure the trunk interface circuit in any of five different trunk supervisory states, as listed in the following table.

| SUPERVISORY STATES | RELAYS C | B | A | BINARY OUTPUT OUTPUT LEAD 60 | OUTPUT LEAD 61 |
|---|---|---|---|---|---|
| 1 Idle, ground start | 0 | 0 | 0 | Tip GND | Ringing |
| 2 Idle, loop start | 0 | 0 | 1 | — | Ringing |

| SUPERVISORY | RELAYS | | | BINARY OUTPUT | |
|---|---|---|---|---|---|
| STATES | C | B | A | OUTPUT LEAD 60 | OUTPUT LEAD 61 |
| 3 Ring ground | 0 | 1 | 0 | Tip GND | — |
| 4 Off-hook | 1 | 1 | 1 | Rev Current | Fwd Current |
| 5 Break, dialling | 0 | 1 | 1 | — | — |

Considering the trunk interface circuit in more detail, elements 22 through 29 in combination with the illustrated relay switch contacts provide for configuring the trunk interface circuit for operation in each of the above listed supervisory states. A break contact A1 and a make contact C1 are connected in parallel between the tip lead of the trunk and the resistor 20, via one half of the winding 11. A resistor 22 and a capacitor 23 connected as shown provide contact protection for the contacts A1 and C1. Make contacts C2 and B1 are connected in series between the ring lead of the trunk and the resistor 20, via the other half of the winding 11. A capacitor 21 is connected as shown between the junction of the make contacts C2 and B1 and the junction of the resistors 20 and 22. A resistor 26 is connected in parallel with the make contact B1. As shown, a resistor 27, a make contact B2 and a break contact A2 are connected in series between ground and the ring lead of the trunk, via the other half of the winding 11. A lead 30a is directly connected from the junction of the contacts B1 and C2 to the circuit indicated at 30. The lead 30a is also connected via a make portion of a transfer contact A4. A lead 30b is connected from the junction of the resistors 20 and 22 to the circuit indicated at 30 via a make portion of the transfer contact A3, and via a voltage divider consisting of resistors 28 and 29. The junction of the resistors 28 and 29 is connected with a break portion of the transfer contact A4. A break portion of the transfer contact A3 is connected to a power terminal −V.

The circuit generally indicated at 30 includes first and second differential amplifiers 31a and 31b, having outputs connected to first and second d.c. signal paths 36a and 36b respectively. Input signals are coupled to an inverting input of the amplifier 31a through a resistor 33a, with values of the resistor 33a and a feedback resistor 32a determining the gain of amplifier 31a. Input signals are coupled to an inverting input of the amplifier 31b through a resistor 33b, with values of the resistors 33b and a feedback resistor 32b determining the gain of the amplifier 31b. In this example the gains of the amplifiers 31a and 31b are arranged to be similar. The junction of the transfer contact A4 is connected through a voltage divider consisting of resistors 34a and 35a to ground. The lead 30b is connected through a voltage divider consisting of resistors 34b and 35b to ground. A non-inverting input of the amplifier 31b is connected to the junction of the resistors 34b and 35b. The first and second d.c. signal paths 36a and 36b are resistively coupled to respective inputs of the bidirectional current regulator circuit 40 via resistors 37a and 37b. Capacitors 38a and 38b are connected as shown and each serve to provide a low impedance path to ground for a.c. voice frequency signals.

The bidirection current regulator circuit generally indicated at 40 includes first and second controllable unidirectional current sources, distinguished by component label suffixes a and b respectively. The first and second current sources include inputs connected at the junction of the resistor 37a and the capacitor 38a and at the junction of the resistor 37b and the capacitor 38b, respectively. In the first current source an amplifier 41a, a transistor 43a and resistor 44a are connected as shown in voltage follower configuration in combination with a common junction 46. In the second current source an amplifier 41b, a transistor 43b and a resistor 44b are connected as shown in voltage follower configuration with the common junction 46. A resistor 47 is connected between the common junction 46 and ground. The resistor provides a current path between the common junction 46 and ground. The transistor 43a has a collector connected to one end 15 of the compensating winding 13 and an emitter connected to the common junction 46. The transistor 43b has a collector connected to the other end 16 of the compensating windind 13 and an emitter connected to the common junction 46. A resistor 48 is connected between the power terminal −V and the centertrap terminal 17 of the compensating winding 13. A diode protection network 49 is connected across the compensating winding 13. Diodes 42a and 42b, connected in series with the outputs of the amplifier 42a and 42b respectively, provide a switching action such that only one of the unidirectional current sources is operationally effective at any one time. The greater of the potentials appearing at the non-inverting inputs of the amplifiers 41a and 41b appears at the common junction, with the corresponding transistor 43a or 43b being conductive to accordingly regulate current in one or the other directions in the compensating winding 13.

The supervisory signal detector generally indicated at 50 includes a voltage divider consisting of resistors 57 and 58 connected in series between ground and a power terminal +V. A voltage tap 59 at the junction of the resistors 57 and 58 is connected to non-inverting inputs of differential amplifiers 51 and 54. A resistor 53 and a capacitor 52 are connected in series between the first d.c. signal path 36a and ground. The junction of the capacitor 52 and the resistor 53 is connected to an inverting input of the amplifier 51. A resistor 55 and a capacitor 56 are connected in series between the second d.c. signal path 36b and ground. The junction of the resistor 55 and the capacitor 56 is connected to an inverting input of the amplifier 54. Outputs 60 and 61 of the amplifier 51 and 54 provide the 2 bit binary binary signal for use by the controller in the associated telephone facility. The values of the elements 52, 53 and 55, 56 are chose to filter transients. 20 Hz ringing signals on the trunk show up as pulses at the outputs 60 or 61, and the PBX controller will normally count the pulses to validate ringing.

Operation of the trunk interface circuit in each of the five supervisory states will now be discussed.

(1) IDLE, GROUND START

This state occurs during a time when the two-wire trunk is idle and the trunk interface circuit is configured for ground start operation. When idle, none of the relays A, B or C, are activated and the trunk interface circuit is prepared to detect ringing signals on the trunk. When ringing signals are applied remotely at the CO across the trunk, current flow across the resistors 20 and 26, and the capacitor 21 develops a potential which appears at the amplifier 31b and periodically exceed the potential at the junction of the resistors 34b and 35b. The amplifier 31b generates a corresponding periodic square wave and its output triggers are amplifier 54, causing its output 61 to generate pulses, indicating ringing on the trunk.

If the tip lead of the two-wire trunk is grounded at the CO, current flows via the break portion of the transfer contact A3, the resistors 28 and 29 and the break contact A1. If sufficient current flows, the resulting voltage developed across the resistor 28 is amplified by operational amplifier 31a and appears on the first d.c. signal path 36a. If this voltage exceeds the voltage at the voltage taps 59, then the amplifier 51 provides a low voltage at its output 60.

(2) IDLE, LOOP START

In this supervisory state, the trunk interface ircuit is configured to be direct current isolated from the tip and ring leads, relay A being actuated. Ringing signals on the trunk are AC-coupled to the capacitors 23 and 25 to the inputs of the amplifier 31b. Thereafter the response of the amplifiers 31b and 54 is pass the ringing signals as described previously in supervisory state 1.

(3) RING GROUND

In order to seize a ground start trunk at the associated telephone facility, it is necessary to apply ground at the ring lead of the two-wire trunk. This is accomplished by operating the relay B so that a current path is established through the break contact A2, the make contact B2 and the resistor 27 to ground. The CO will acknowledge seizure of the trunk by applying ground to the tip lead, which is detected as previously described in supervisory state 1.

(4) OFF HOOK

In this supervisory state, all the relays A, B and C are actuated, and both the amplifiers 31a and 31b are connected to receive voltage developed across the resistor 20. If for example the resistor 20 has a value of 200 ohms, a 20 milliamp current flowing from the tip lead to the ring lead will result in about 0.4 volts at the output of the amplifier 31b. With a threshold level of about 0.3 volts at the voltage tap 59, a tip and ring lead current of greater than 15 milliamps is required for signal assertion at either of the outputs 60 and 61. In this case the resistor 53 in combination with the capacitor 52 and the resistor 55 in combination with the capacitor 56, each act as a noise filter to prevent transient signals or noise signals from falsely generatint output signals at the amplifiers 51 and 54, respectively.

Likewise in the first d.c. signal path 36a, the resistor 37a and the capacitor 38a, act as a low pass filter and in the second d.c. signal path 36b, the resistor 37b and the capacitor 38b act as a low pass filter whereby signals received by the amplifiers 41a and 41b are substantially void of a.c. voice frequencies.

Current compensation in accordance with the higher of the voltage levels at the outputs of the amplifiers 31a and 31b is provided by the bidirectional current regulator through the compensating winding 13. The compensating current is conducted from the centertap 17 exclusively through one or the other of the transistors 43a and 43b in an amount to develop a corresponding voltage at the common junction 46. The resistance between the common junction 46 and ground is chosen to provide the compensating current in accordance with the turns ratio of the compensating winding 13 and the first winding 11. For example, in a case where the compensating winding has eight turns for every turn of the first winding, the compensating current required is one eighth of the d.c. current flowing in the first winding.

(5) DIALLING

Dial pulses are transmitted from the trunk interface circuit under the direct control of the associated telephone facility. In this case the relay C is actuated and released to cause the make relay contacts C1 and C2 to repeatedly interrupt the current from the C.O.

What is claimed is:

1. A trunk interface circuit for interfacing a two-wire trunk with a telephone facility, comprising:
   a transformer having a core, a compensating winding, and a first winding structure including first and second portions for connection to the two-wire trunk;
   circuit means for providing a signal indication of magnitude and either of forward and reverse directions of direct current flow in the first winding, the circuit means including a resistor for connection to the first and second portions of the first winding structure;
   switch means controllable by the telephone facility for connecting in the first and second portions of the first winding structure in series current flow relationship with the resistor; and
   a bidirectional current regulation circuit connected to the compensating winding and responsive to the signal indication from the circuit means, for conducting a compensating current in either of two directions in the compensating winding to substantially reduce d.c. flux associated with direct current flow in the first winding structure, whereby the physical size requirement of the core is reduced.

2. A trunk interface circuit as defined in claim 1 wherein the circuit means further comprises:
   a first d.c. amplifier circuit for generating the signal indication in response to a forward potential developed across the resistor resulting from current flow in the forward direction;
   a second d.c. amplifier circuit for generating the signal indication in response to a reverse potential developed across the resistor resulting from current flow in the reverse direction;
   a first d.c. signal path for coupling the signal indication from the first d.c. amplifier circuit to a first input of the bidirectional current regulation circuit; and
   a second d.c. signal path for coupling the signal indication from the second d.c. amplifier circuit to a second input of the bidirectional current regulation circuit.

3. A trunk interface circuit as defined in claim 2, further comprising:
   means for generating a threshold signal level; and
   a supervisory signal detector having first and second inputs connected to the first and second d.c. signal paths, a third input connected to the threshold signal level generating means and first and second outputs, the supervisory signal detector being responsive to the signal indications from the first and second d.c. signal paths and to the threshold signal level for asserting signals at the corresponding first and second outputs, whereby 2-bit binary signal indications of supervisory signalling on the trunk are provided for use in the associated telephone facility.

4. A trunk interface circuit as defined in claim 2 further comprising:
   a voltage divider having a voltage tap for providing a threshold signal level; and first and second differential amplifiers each having an output, a non-inverting input connected in common to the voltage tap, and each having an inverting input for receiving said signal indication from the first and second d.c. signal paths respectively via first and second resistive capacitive networks, each of the first and second differential amplifiers being responsive to a signal level at its inverting input exceeding the threshold signal level for asserting its output, whereby 2-bit binary signal indications of supervisory signalling on the trunk are provided for use in the associated telephone facility.

5. A trunk interface circuit as defined in claim 2 wherein the compensating winding includes a pair of end terminals and a centertap terminal, and wherein the bidirectional current regulation circuit comprises:

a pair of controllable unidirectional current sources each having an input corresponding to said first and second inputs respectively an outut connected to a respective one of the end terminals and a reference terminal, the reference terminals being joined at a common junction with a resistance for connection in series with a power source.

6. A trunk interface circuit for interfacing a two-wire trunk with a telephone facility, comprising:

a transformer having a core, a compensating winding, and a first winding structure including first and second portions for connection to the two-wire trunk;

a resistor connected in series current flow relationship between the first and second portions of the first winding for providing a terminating resistance for the two-wire trunk; and a current regulation means connected to the compensating winding and being responsive to a voltage being developed across the resistor in association with a direct current flow in the trunk, to conduct a direct current via the compensating winding in an amount proportional to the developed voltage and in one of two directions corresponding to a polarity of the developed voltage.

* * * * *